No. 615,150. Patented Nov. 29, 1898.
C. H. FERGUSON.
BALL BEARING.
(Application filed Jan. 22, 1898.)

(No Model.) 2 Sheets—Sheet 1.

WITNESSES:
H. A. Redfield.
G. H. Longard.

INVENTOR:
Charles H. Ferguson
BY Casper L. Redfield
ATTORNEY.

THE NORRIS PETERS CO., PHOTO-LITHO., WASHINGTON, D. C.

No. 615,150. Patented Nov. 29, 1898.
C. H. FERGUSON.
BALL BEARING.
(Application filed Jan. 22, 1898.)

(No Model.) 2 Sheets—Sheet 2.

WITNESSES:
Howard A. Redfield
W. T. Angell

INVENTOR:
Charles H. Ferguson
BY Casper L. Redfield
ATTORNEY.

UNITED STATES PATENT OFFICE.

CHARLES H. FERGUSON, OF CHICAGO, ILLINOIS, ASSIGNOR TO HIMSELF AND BERNARD V. H. SCHULTZ, OF SAME PLACE.

BALL-BEARING.

SPECIFICATION forming part of Letters Patent No. 615,150, dated November 29, 1898.

Application filed January 22, 1898. Serial No. 667,529. (No model.)

*To all whom it may concern:*

Be it known that I, CHARLES H. FERGUSON, a citizen of the United States, residing at Chicago, in the county of Cook and State of Illinois, have invented certain new and useful Improvements in Ball-Bearings, of which the following is a specification.

Figure 1:
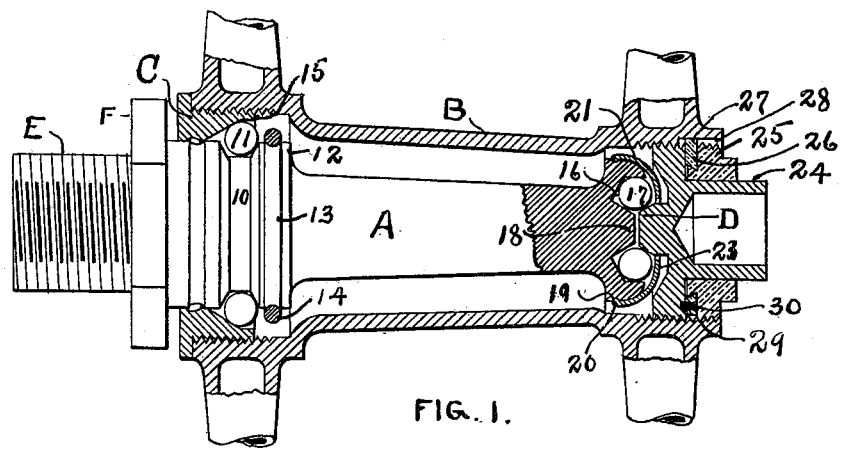
Figure 2:
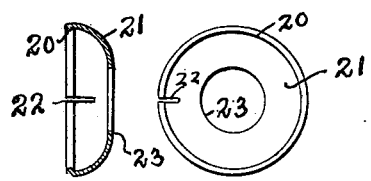
Figure 3:
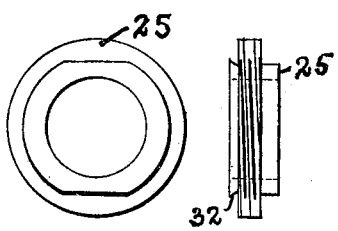
Figure 4:
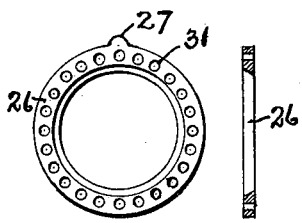
Figure 8:
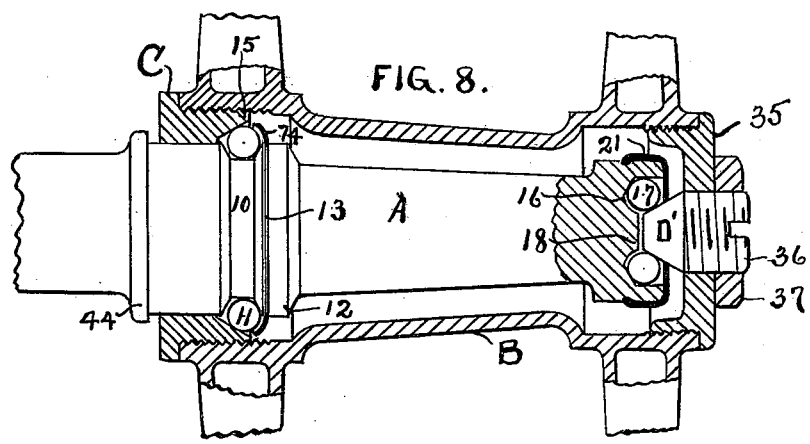

In the accompanying drawings, Figures 1 and 8 are enlarged sectional elevations of my improvements as applied to bicycle-pedals. Figs. 2 to 7 are details of the construction shown in Fig. 1, and Fig. 9 shows the arrangement when applied to a wagon-hub.

Figure 9:
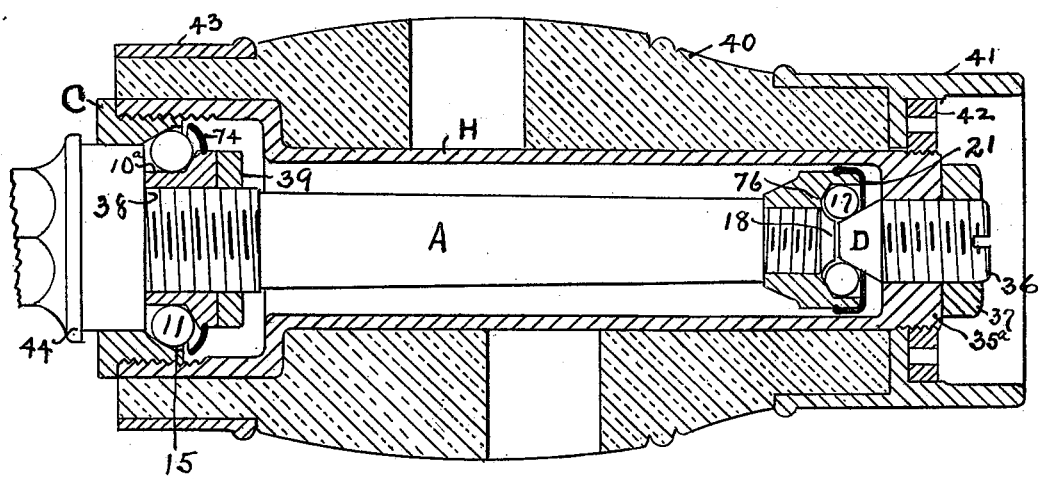

I will first describe more particularly the constructions shown in Fig. 1 and afterward in Figs. 8 and 9. In the said drawings, A is a spindle which represents the pin of a bicycle-pedal in Figs. 1 and 8 and the axle of a wagon in Fig. 9.

In Fig. 1 the left end of the spindle A is provided with a screw-threaded portion E, and adjacent to this is a nut F, formed solid with the body of the spindle. In the cylindrical surface of the spindle A, at a little distance to the right of the nut F, is cut a groove 10, that serves as a race for the balls 11. A little farther to the right the spindle A is reduced in diameter, so as to leave a sort of bead 12 between the groove or race 10 and the reduced part of the spindle A. The outside diameter of the bead 12 is the same as or not greater than the diameter of the spindle between the race 10 and the nut F, and all parts of the spindle farther to the right have the same restriction as to diameter. The object of this is to permit the ring C, which serves as a cup for the balls 11 when in the race 10, to be slipped over the spindle until stopped by contact with the nut F. The axial length of the ring or cup C is somewhat increased by a projecting lip 15, that overhangs the balls 11 and does not entirely uncover them when said ring is moved back against the nut or stop F. In the bead 12 is cut a slight groove 13, into which is sprung a ring 14, that serves as a retainer for the balls 11. The length of the cup C, including the lip 15, and the height of the ring 14 above the surface of the bead 12 are so related to the distance between the nut F and the diameter of the balls 11 that the distance between the lip 15 and the ring 14 is less than the diameter of said balls, even when said cup is moved to its extreme limit against the nut F. Consequently the balls 11 cannot be removed from the race 10 when the ring 14 is in the groove 13; but the distance between the lip 15 and the bead 12 is greater than the diameters of the balls, so that when the ring 14 is removed the balls may also be removed. The ring 14 therefore acts as a retainer to keep the balls 11 in the race 10. In assembling these parts the cup C is first placed over the spindle adjacent to the nut F. The balls 11 are then dropped into place and the ring afterward sprung into its groove 13. They are removed in the reverse order. To facilitate springing the ring 14 into place, it is split or cut, as shown in detail in Fig. 7. In the interior of the other or outer end of the spindle A is cut another race 16, in which run the balls 17. The race 16 takes the form of a cup—that is, it bears on the outer rather than the inner surfaces of the balls 17. In the outer surface of the spindle, where it is enlarged to permit of forming the cup-race 16, is cut a small groove 19, into which is sprung the bead 20 of the retainer 21. This retainer, which is shown in detail in Fig. 2, extends over the end of the spindle, so as to partially inclose the balls 17. In the center of the cup 16 is an axial projection 18, which extends to approximately the position of the plane that passes through the centers of the balls 17. The projection 18 and the inner edge 23 of the retainer 21 are so related to each other that when the retainer 21 is in position the distance between the edge 23 and projection 18 is less than the diameters of the balls 17. As thus far explained, the cup C and retainer 14 hold the balls 11 from dropping out of the groove 10, because the nut or heck F does not permit the cup C to move far enough back to permit the balls 11 to pass between the lip 15 and ring 14, and the retainer 21 and projection 18 likewise prevent the balls 17 from displacement. It will therefore be evident that the parts so far described will retain both sets of balls in their respective races without the aid of any other parts.

The cup or ring C is screwed into the rear end of a shell B, that surrounds all parts of the spindle to the right of said cup C. Into the other or outer end of the shell B is screwed a cone D, that engages the balls 17 and with the cup 16 furnishes the complete race for said balls. The cup C is screwed up to a fixed position in the shell B—that is, so that the lateral flange on said cup C abuts against the rear end of the shell B. When so screwed into place, the cup C can only be removed by the exertion of considerable force and for all practical considerations is solid with the shell B. The cone D is adjustable in the shell B and when screwed up into contact with the balls 17 not only takes up any slack or looseness at that point, but draws the shell B, and consequently the cup C, to the right, thereby also taking up looseness at the balls 11. It therefore follows that the complete race for the balls 11 is made up of a fixed member consisting of the groove 10 and bead 12 and an adjustable member consisting of the cup C, and that the complete race for the balls 17 is made up of a fixed member consisting of the cup 16 and an adjustable member consisting of the cone D, also that both adjustable members are simultaneously adjusted by adjusting the cone D in the shell B. Surrounding the stem 24 on the cone D are a lock or jam nut 25 and a washer 26, which has a teat or projection 27, that enters a groove 28 in the thread 29 of the shell B. The groove 28 is parallel with the axis of the shell B, so that when said teat 27, is in said groove 28 the washer is restrained, so that its movement is only axial in its relationship to the shell B. The jam or lock nut 25 screws into the shell B, and consequently has both a rotary and an axial movement, while that of the washer is only axial. On the washer-seat of the cone-block D is a pin 30, that enters a hole 31 through the washer 26. There are a number of these holes 31 in the washer 26, as is shown in detail in Fig. 4. As the washer 26 is prevented from turning by the teat 27 in the groove 28, it will be evident that the cone D will be prevented from turning when the pin 30 is inserted in one of the holes 31 in the washer 26. It will also be evident that if the washer 26 is withdrawn from its seat on the cone-block D far enough to clear the pin 30 the cone D can be adjusted to any required position, and by returning and securing the washer again on its seat with the pin 30 in the nearest hole 31 the cone D will be securely locked at its new adjustment. To facilitate the movement of the washer 26 to and from its seat, the inner edge is beveled, as more clearly shown in Figs. 4 and 6, and inserted in an undercut or dovetail 32 in the lock-nut 25. When the lock-nut 25 and washer 26 are secured together in this manner, any axial movement of one will be followed by a corresponding axial movement of the other. They are, however, loose enough so that one will freely turn on the other.

Figure 5:
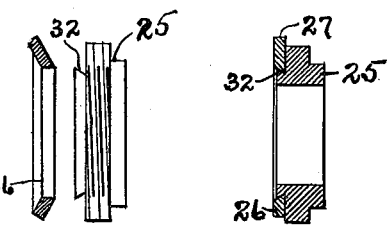
Figure 6:
Figure 7:
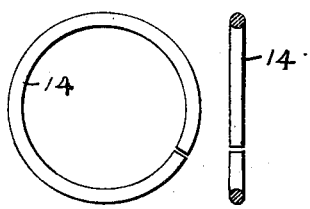

It therefore follows that when the lock-nut 25 and the washer 26 are inserted in the end of the shell B the nut will have both a rotary and an axial movement similar to that of any other nut, while the washer, by virtue of the fact that the teat 27 slides in the groove 28, is restrained, so that it partakes only of the axial movement of the nut 25. When in running position, as shown in Fig. 1, the action of the balls 17 on the cone D tends to turn said cone, and thus disturb its adjustment. When, however, the washer 26 is inserted in place, with the pin 30 inserted in one of the holes 31 and the nut screwed down tight, these parts (the nut and the washer) act as a locking device for the cone D. This form of locking device is particularly secure, as there is no rotary action on the nut 25, tending to turn it, because its seat is on the washer, which is held from turning by the teat 27. Though the washer 26 and nut 25 serve to lock the cone D at any required adjustment, that adjustment may be readily changed by unscrewing the lock or jam nut 25, which action withdraws the washer axially. When the washer has thus been moved far enough away to clear the pin 30, the cone D may be moved to a new position and then securely locked at that position by again returning the nut and washer to their seat. To get the washer 26 in position over the dovetail 32 on nut 25, it is dished, as shown in Fig. 5, when it may be made to pass over the dovetail 32. The washer is then pressed down flat, when the nut and washer take the permanent form shown in Fig. 6.

In Fig. 1 the head for the shell B is made solid with the cone D; but in Fig. 8 this head is a separate piece 35, screwed into a fixed position, and the cone D is formed on the end of a screw 36, that is adjustable in this head 35. A jam-nut 37 serves as a locking device to hold the screw 36, and consequently the cone D, from displacement. In this case the washer 26 and its coöperating parts are omitted; but otherwise it is substantially the same as in Fig. 1. In Fig. 9 the head 35$^a$ is cast solid with the shell H, which corresponds to the shell B in Figs. 1 and 8, and the cup 76, which corresponds to the cup 16, is made removable, so that it may be renewed when worn. The race 10$^a$ is also formed in a separate piece that is screwed onto the spindle A and up against a shoulder 38 on said spindle. A jam-nut 39 secures race 10$^a$ from displacement. The cup 76 is also screwed up against a shoulder on the spindle A, and to avoid the use of a jam-nut at this place the threads are made right hand on one side of the wagon and left hand on the other. The heck F in Fig. 1, which serves as a stop for the cup C when unscrewed from the shell B, is replaced by a bead 44 in Figs. 8 and 9, which furnishes the necessary stop to prevent the cup C from retreating far enough from the balls 11 to permit them to fall out of their race when their retainer is in place. The retainers 74 in Figs.

8 and 9 are of a different section from retainer 14 of Fig. 1; but they are otherwise the same and perform the same function.

When it is desired to inspect the balls, the cup C is unscrewed from the shell B, (or H,) when the said shell may be removed, leaving the balls 11 and 17 securely held in their respective places in the spindle A by their retainers. By removing these retainers the balls may also be removed. After such inspection the shell B (or H) may be returned to place, and by again screwing the cup C up to its fixed position against the rear end of the shell the fixed and movable members of both races will be again brought to their previous adjustment.

One of the advantages of my construction is that I can at any time remove the inclosing shell and inspect the balls without spilling them out of their races, as occurs when any one of the ordinary constructions is used. Another advantage is that I can at any time remove the balls from their respective races and again return all parts to their original position without going through the tedious process of adjusting the race members to the balls. This last advantage comes about by the fact that the adjustment for both sets of balls is by adjustment of the cone D, and this part is not disturbed when opening for inspection. Still another advantage is that I accomplish the simultaneous adjustment of both bearings by screwing the cone D in or out in the shell B, because when cone D is screwed in toward balls 17 the shell B draws cup C toward balls 11. This, therefore, is a means of adjusting both bearings by applying the adjustment directly to only one of them.

What I claim is—

1. A spindle provided with a ball-holding cup within the end thereof, balls within said cup, and a removable retainer secured to said spindle and serving to retain balls in said cup.

2. A spindle provided with a ball-holding cup cut within the end thereof and having an axial projection located at the center of said cup, a cone and means for supporting it adjacent to said cup, balls between said cup and cone, and a retainer removably secured to the body of said cup.

3. In combination with a shell or hub of a ball-bearing, a spindle having an exterior ball-race near one end and an interior ball-race near the other end, balls within said races, and devices located near each race for retaining said balls within their respective races when the said shell or hub is removed.

4. A hub or inclosing shell, a spindle therefor having a cup formed within the end thereof, a cone screwed into said shell adjacent to said cup, balls within the completed race formed by said cup and cone, and a retainer adapted to retain said balls within said cup when said cup and cone are separated.

5. In combination with a spindle provided with a cup-shaped ball-race cut within the end thereof and having an axial projection at the center of said cup, balls within said cup, and a retainer secured to the outer surface of said cup and extending around the end thereof to a point which leaves less space between said retainer and said axial projection than the diameters of said balls.

6. A ball-race consisting of a fixed member and an adjustable member, a shell inclosing both, a lock-nut adapted to secure said adjustable member to said shell, a washer, means for preventing said washer from partaking of the rotary movement of said nut, and means for retaining and compelling said washer to partake of the axial movement of said nut.

7. A shell, a cone screwed therein, a lock-nut, a washer secured thereto and rotatable thereon, a seat on said cone for the reception of said washer, a pin on said seat, a series of openings in said washer for the reception of said pin, and means for preventing said washer from turning in said shell.

8. A spindle and an inclosing shell therefor, a ball-race formed by a fixed member consisting of a cup cut in the end of said spindle and an adjustable member consisting of a cone screwed into said shell, balls within said race, and a locking device for securing said adjustable member from displacement.

9. In combination with a cone and a shell into which said cone is screwed, a washer provided with a projection extending into a groove in said shell, an interlocking device between said washer and said cone, and a lock-nut screwed into said shell against said washer and serving to hold it in engagement with said cone.

10. In combination with a spindle providing the fixed member of a ball-bearing and an inclosing shell therefor, an adjustable member for said bearing screwed into said shell, balls within the race formed by said members, a washer provided with means for preventing it turning in said shell, means whereby said washer will keep said adjustable member from turning when in engagement therewith, and a nut for keeping said washer and said adjustable member in engagement.

11. The combination with the fixed and adjustable members of a ball-race and balls therein, of a shell into which the adjustable member is screwed, a washer having a seat on the adjustable member and provided with a projection on its periphery, a groove in said shell for the reception of said projection, a nut secured to said washer and rotatable thereon, and a locking device between said washer and said adjustable member.

12. The combination with the fixed and adjustable members of a ball-race and balls therein, of an inclosing shell into which the adjustable member is screwed, a lock-nut and a washer for said adjustable member, an axial groove cut in the thread of said shell, a projection on said washer adapted to enter said groove, and means for causing said washer to partake of the axial movement of said nut.

13. In combination with a shell and a cone screwed therein, a locking-nut provided with a circular dovetail projection, and a solid washer provided with an inner beveled edge adapted to engage and be retained by said dovetail.

14. A spindle having a groove cut in its cylindrical surface, said groove serving as the fixed member of a ball-race, a shell, a cup screwed into said shell and serving as the adjustable member of said ball-race, balls within the completed race thus formed, a stop for limiting the movement of said cup from said balls, and a removable ring secured to said spindle and serving to retain said balls within their race.

15. A ball-race consisting of a fixed member as 10 and a movable member as C, balls within the race thus formed, a shell surrounding said race and into which the movable member is screwed, a stop for limiting the movement of said movable member from said balls, and a retainer adapted to prevent said balls from falling out of their race when said movable member is in contact with said stop.

16. In combination with a spindle provided with ball-bearings at each end, each bearing being provided with one fixed and one movable member, balls within each bearing, a shell into which the movable members are screwed, means for adjusting the position of both movable members by the axial movement of one member, and means for permitting the removal of balls from both bearings by unscrewing the other movable member.

17. In a ball-bearing provided with a ball-race at or near each end of the spindle thereof, means for adjusting the members of both races, and means for permitting the removal and return of the balls from either or both races without disturbing such adjustment.

18. In a bearing provided with a ball-race at or near each end of the spindle thereof, means for adjusting the members of both races, a locking device for retaining such adjustment when made, means for permitting the withdrawal and return of the spindle without disturbing such adjustment, and devices for retaining the balls in both races when the spindle is so removed.

19. In a bearing provided with a ball-race at or near each end, means for adjusting the members of both races simultaneously from one point, a locking device for securing such adjustment when made, and means for opening said bearings for inspection without disturbing said adjustment.

20. In combination with a spindle provided with a ball-race at or near each end, balls within said races, means for adjusting the members of both races, a locking device for securing such adjustment when made, and means for permitting the balls to be removed from and returned to their respective races without disturbing such adjustment.

CHARLES H. FERGUSON.

Witnesses:
C. L. REDFIELD,
H. A. REDFIELD.